(12) United States Patent
Irazabal (10) Patent No.: US 11,558,180 B2
(45) Date of Patent: Jan. 17, 2023

(54) KEY-VALUE STORE WITH BLOCKCHAIN PROPERTIES

(71) Applicant: International Business Machines Corporation, Armonk, NY (US)

(72) Inventor: Jeronimo Irazabal, Buenos Aires (AR)

(73) Assignee: International Business Machines Corporation, Armonk, NY (US)

( * ) Notice: Subject to any disclaimer, the term of this patent is extended or adjusted under 35 U.S.C. 154(b) by 219 days.

(21) Appl. No.: 16/747,370

(22) Filed: Jan. 20, 2020

(65) Prior Publication Data

US 2021/0226768 A1    Jul. 22, 2021

(51) Int. Cl.
| | |
|---|---|
| *H04L 9/06* | (2006.01) |
| *H04L 9/08* | (2006.01) |
| *H04L 41/0604* | (2022.01) |
| *H04L 9/32* | (2006.01) |

(52) U.S. Cl.
CPC .......... *H04L 9/0637* (2013.01); *H04L 9/0825* (2013.01); *H04L 9/0861* (2013.01); *H04L 9/0891* (2013.01); *H04L 9/3242* (2013.01); *H04L 41/0627* (2013.01)

(58) Field of Classification Search
CPC ... G06F 16/23; G06F 16/235; G06Q 2220/00; H04L 63/12
See application file for complete search history.

(56) References Cited

U.S. PATENT DOCUMENTS

| | | | |
|---|---|---|---|
| 10,158,479 B2 | 12/2018 | Chapman et al. | |
| 10,225,078 B2 | 3/2019 | Bibera et al. | |
| 11,216,811 B2* | 1/2022 | Huang | H04L 9/0637 |
| 11,250,481 B2* | 2/2022 | Yang | G06N 20/00 |
| 11,294,943 B2* | 4/2022 | Brunet | G06F 16/3337 |
| 2017/0228371 A1 | 8/2017 | Seger | |
| 2018/0005186 A1* | 1/2018 | Hunn | G06F 16/93 |
| 2018/0096163 A1 | 4/2018 | Kadt et al. | |
| 2018/0137465 A1* | 5/2018 | Batra | H04L 67/104 |
| 2019/0050402 A1 | 2/2019 | Horii et al. | |
| 2019/0303853 A1* | 10/2019 | Cantrell | H04L 9/0825 |
| 2020/0051011 A1* | 2/2020 | Dasari | H04L 9/0637 |
| 2020/0074552 A1* | 3/2020 | Shier | G06Q 20/10 |
| 2020/0104393 A1* | 4/2020 | Setty | H04L 63/123 |
| 2020/0127861 A1* | 4/2020 | Doshi | H04L 9/0822 |
| 2020/0202668 A1* | 6/2020 | Cotta | G07F 17/3244 |

FOREIGN PATENT DOCUMENTS

CN    109408513 A    3/2019

OTHER PUBLICATIONS

El-Hindi et al., "BlockChainDB—Towards a shared database on blockchains", International Conference on Management of Data, Jun. 30-Jul. 5, 2019, Amsterdam, Netherlands.

* cited by examiner

*Primary Examiner* — Olugbenga O Idowu (57) ABSTRACT

An example operation may include one or more of receiving a request associated with a key-value pair stored in a database, determining whether a state of the key-value pair has changed since a most recently received request, and in response to a determination that the state of the key-value pair has changed, generating a data block that includes a changed state of the key-value pair and adding the generated data block to a hash-linked chain of data blocks.

18 Claims, 6 Drawing Sheets

Settlement Rules     250

Condition 251

If vehicle is going faster than 45 mph, generate tick for keys 6, 7, and 8

Condition 252

Generate a tick when a state of keys 4 and 10

Condition 253

Business Rule / Identification of Key(s)

. . .

. . .

. . .

Condition N

Business Rule / Identification of Key(s)

KEY-VALUE STORE WITH BLOCKCHAIN PROPERTIES

TECHNICAL FIELD

This application generally relates to data storage, and more particularly, to a key-value store that stores current values of data items as key-value pairs and that also stores changes in state to the key-value pairs in a blockchain.

BACKGROUND

Blockchain systems store data on an immutable ledger, provide distributed and decentralized access to the immutable ledger through non-trusting participants, establish consensus requirements for agreement between the non-trusting participants such that no one entity can change the immutable ledger without agreement from others, invoke smart contracts, and the like. A blockchain is typically formed by a network of participants which agree to add a block (with data stored therein) to the immutable ledger. Before being added, the block is linked to a previous block on the immutable ledger thereby forming a chain. This immutable and incorruptible nature of blockchain makes it safe from falsified information and hacks. The decentralized nature also gives it the unique quality of being trustless, in that parties do not need to establish trust before they can transact safely.

Meanwhile, a key-value store (also referred to as a key-value database) is a type of non-relational database that uses a simple key-value method to store data. Within the key-value store, data is stored as a collection of key-value pairs where the key serves as a unique identifier. Both the keys and the values can be various types of data items or combination of data items, ranging from simple objects to complex compound objects. Typically, the key-value store keeps only a current value (most recent state) of a key-value pair.

SUMMARY

One example embodiment may provide an apparatus that includes a processor configured to one or more of receive a request associated with a key-value pair stored in a database, determine whether a state of the key-value pair has changed since a most recently received request, and in response to a determination that the state of the key-value pair has changed, generate a data block that includes a changed state of the key-value pair and add the generated data block to a hash-linked chain of data blocks.

Another example embodiment may provide a method that includes one or more of receiving a request associated with a key-value pair stored in a database, determining whether a state of the key-value pair has changed since a most recently received request, and in response to a determination that the state of the key-value pair has changed, generating a data block that includes a changed state of the key-value pair and adding the generated data block to a hash-linked chain of data blocks.

A further example embodiment may provide a non-transitory computer readable medium comprising instructions, that when read by a processor, cause the processor to perform one or more of receiving a request associated with a key-value pair stored in a database, determining whether a state of the key-value pair has changed since a most recently received request, and in response to a determination that the state of the key-value pair has changed, generating a data block that includes a changed state of the key-value pair and adding the generated data block to a hash-linked chain of data blocks.

DETAILED DESCRIPTION

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

A key-value store (KVS) is often considered the simplest type of NoSQL database. Within a key-value store, each unique identifier is referred to as a key with its associated value (key-value pair). The key uniquely identifies the data item within the key-value store. Meanwhile, the value can be a byte array, data structure, binary large object (BLOB), text, numeral, or the like. A traditional key-value store (KVS) keeps only a most-recent value of a data item (key-value pair) without tracking changes to the state of the data item. Therefore, once a new value for the key has been written, the old value is lost.

The example embodiments provide a key-value store with blockchain properties embedded therein. Thus, a blockchain can be implemented within a more rudimentary storage such as a key-value store. The blockchain can be used to record state changes to one or more key-values over time. For example, values of one or more variables of a web application may be stored in a key-value store and changes in state of the values may be recorded in the blockchain within the key-value store. Business rules can determine what variables to store and when to store data within the blockchain. The example embodiments do not require changes to how the key-value store behaves, but rather adds an additional storage mechanism which can track and provide immutable proof of changes to various data items in addition to traditional storage of key-value pairs.

In a typical blockchain system, a transaction is submitted to blockchain peers which work together to endorse and form a consensus before data is added to a blockchain. As long as the transaction can be performed based on a current state of the blockchain ledger, the transaction is approved and stored within a block of the blockchain. Meanwhile, the blockchain described herein does not require a group of blockchain peers, smart contracts, endorsement, a distributed ledger, or the like. Furthermore, new blocks are conditionally generated based on a state of the data. For example, a new block may only be created when a change in state to a key-value pair has been detected. Thus, redundant storage is removed. In contrast, in a related blockchain system, all transactions are stored within blocks regardless of state.

The key-value store may include a tick operation which triggers the creation of a new block. The key-value store may include an API or software method that enables a web application to request a tick operation. The tick operation may identify one or more keys within the key-value store and may be triggered based on a condition (e.g., business condition, timing, etc.) that can vary based on desired application preferences. In response to receipt of the tick operation, the key-value store may create a block internally. The new block may include current values of one or more key-value pairs associated with the tick operation. In some cases, the tick operation may identify the keys (e.g., a subset of keys) for which the block should be created.

Each block can be stored within a chain of blocks within the key-value store. Here, the chain of blocks may be hash-linked together. For example, a new block may include a hash value of an immediately previous block in the chain thereby creating a hash-link. When desired, a registered user (e.g., of the web application, etc.) may request proof of the data from the blockchain.

The system described herein can be applied to any database system that has a key-value store. As an example, a web application may record the speed of vehicles passing a certain point on the road. Here, a database may record data attributes including a vehicle ID, a velocity, and a timestamp, within a key-value store of the database. In this example, a business rule may provide that the key-value store should record a new block each time a velocity value of a vehicle is greater than a predetermined threshold. The block should contain the keys for velocity value, vehicle ID, and timestamp. When a vehicle passes by a sensor, a tick operation may be triggered. In response to the tick operation, the key-value store may detect whether the velocity value of the vehicle exceeds the predetermined threshold and create a new block proving the condition occurred. Meanwhile, if the velocity value does not exceed the predetermined threshold, the key-value store may determine not to generate a new block. Thus, the state of the data may dictate whether or not a new block is created.

In a related art, a key-value store may be used in conjunction with a blockchain system. For example, a key-value store may be used as an additional storage to a blockchain and may keep the most-recent values of all data items (keys) on the blockchain. However, the key-value store of a traditional blockchain system does not have its own blockchain properties but instead serves as a state DB of the blockchain. In contrast, the example embodiments embed blockchain properties within a key-value store without the need for a separate blockchain system such as peer nodes, smart contracts, or a distributed ledger. Data may be added to the blockchain on a conditional basis. Furthermore, business rules (settlement rules) can specify conditions and data attributes to be recorded.

Some of the benefits of the example embodiments include extending the use of blockchain to a more rudimentary storage system such as a key-value store. In doing so, a state of a key-value can be recorded over time and later viewed. Furthermore, the blockchain is created based on changes in state to data values. Blocks are conditionally added when there is a modified state in contrast to a traditional blockchain which adds all transactions regardless of state. Furthermore, the example embodiments introduce the use of a tick operation which enables periodic recording of proof of data values based on state.

Figure 1:
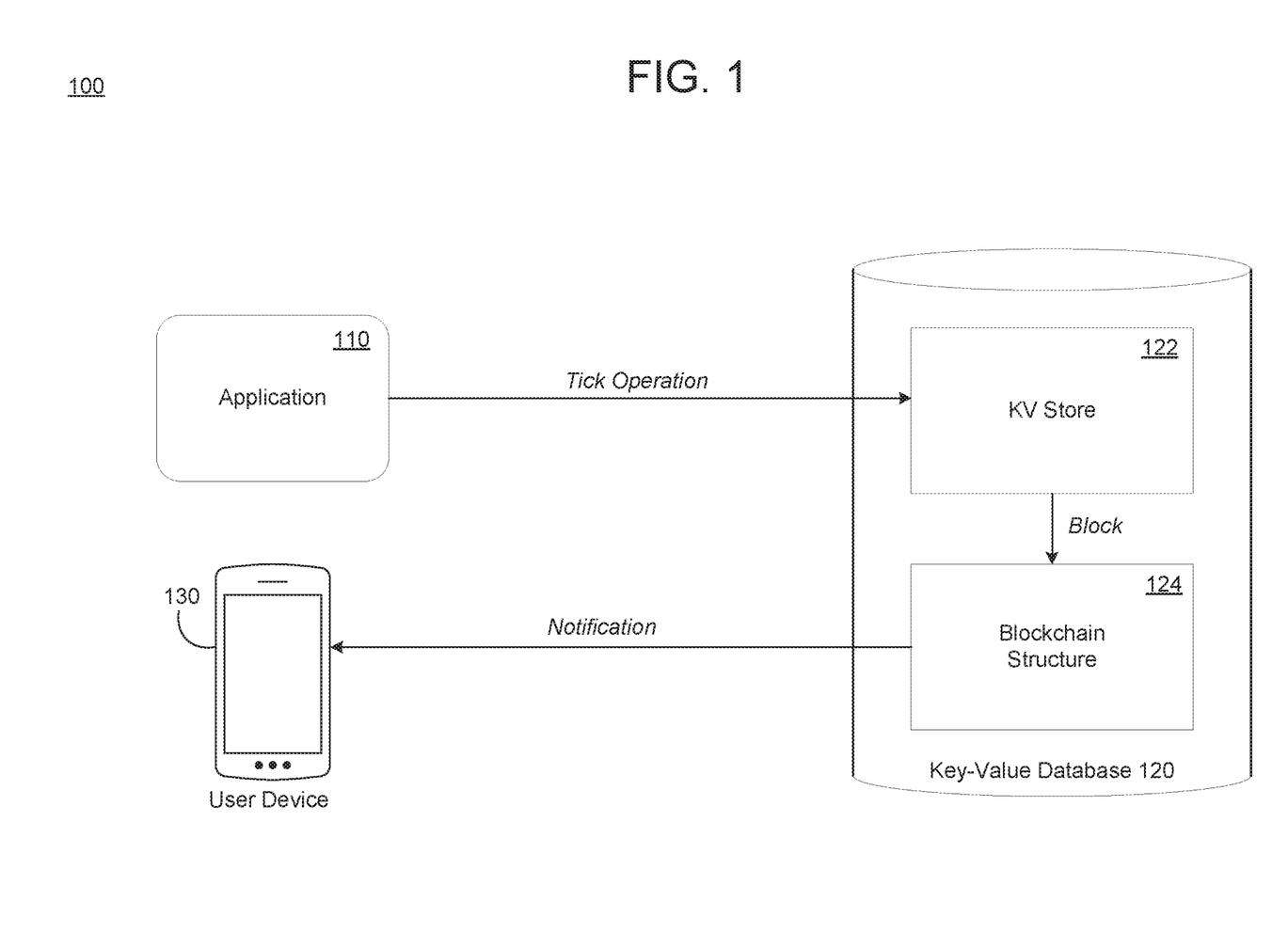
FIG. 1 is a diagram illustrating a computing environment which includes a key-value store according to example embodiments.

FIG. 1 illustrates a computing environment 100 which includes a key-value store 122 according to example embodiments. Referring to FIG. 1, the computing environment 100 includes an application 110 which stores data in a key-value database 120. The key-value database 120 includes the key-value store 122 for storing the current value of data items. The key-value database 120 may include a controller or other program which controls storage of data into the key-values store 122. For example, data may be added to the key-value store 122 via a PUT (K,V) method where K represents a key and V represents a value. Likewise, data may be retrieved from the key-value store 122 using a GET (K,V). The keys in the key-value store 122 may be unique in that no other key in the key-value store 122 may be the same. Meanwhile, each key may have one or more values associated therewith. The key-value store 122 may store pairs of data including the key and its respective value(s). In some embodiments, the key-value store 122 may also store a timestamp with the key-value pairs, thus forming a key-value tuple.

According to various embodiments, the key-value database 120 may be augmented with a blockchain structure 124. The blockchain structure 124 may store blocks of data that are hash-linked to each other. A block may include a value of one or more key-value pairs along with a timestamp. The value of the one or more key-value pairs may be hashed to preserve the privacy of the data. In this case, the key-value database 120 is embedded with blockchain properties but does not require blockchain peers, smart contracts, endorsement, consensus protocols, or the like.

According to various embodiments, blocks are conditionally generated based on state (values of the keys in the key-value storage 122) in contrast to a traditional blockchains where all data is stored when a number of transactions reaches a predefined number/time limit, etc. For example, a tick operation may trigger the creation of a new block. However, a block may not automatically be created by the key-value store 122 in response to the tick operation. In some embodiments, the key-value store 122 (e.g., controller, program, management software, etc. of the key-value store 122) may determine whether a key-value pair associated with the tick operation has changed since a value of the key-value pair was most recently recorded on the blockchain structure 124.

If the value of the key-value pair remains (i.e., it hasn't changed since the last time the key-value pair was stored in the blockchain structure 124), the key-value store 122 may not generate a new block. Instead, the key-value store 122 may generate an instruction not to generate the new block, or may otherwise omit the operation of creating a new block. However, if the key-value store 122 detects that a value of the key-value pair has changed since the key-value pair was last stored on the blockchain structure 124, the key-value store 122 may create a new block based on the new/current value of the key-value pair and add it to the blockchains structure 124. Although the examples herein refer to the key-value pair being stored within the blockchain structure 124, it should also be appreciate that the key-value does not have to be stored. Instead, a hash of the key-value or a hash digest may be stored to conserve storage space.

Although not shown in FIG. 1, the key-value database 120 may include an application programming interface (API) or other method that enables the application 110 to send/communicate a tick operation. The application 110 may create business rules (e.g., settlement rules 250 in FIG. 2B, etc.) which provide conditions on when new blocks of data should be created and what data values (key-value pairs) should be stored in the data blocks. Furthermore, the business rules may be provided to the key-value database 120 for implementation therein.

A user associated with the application 110 may access data stored in the blockchain structure 124 via a user device 130. Here, the user device 130 may receive notifications each time a tick operation causes a new block to be added to the blockchain structure 124. The user device 130 may also request proof of various data items from the key-value database 120. In response, the key-value database 120 may access the blockchains structure 124 to provide historical values of key-value pairs, etc., and provide the data to the user device 130. Accordingly, a user can access both a current state of a key-value pair from the key-value store 122 and also access historical/past values of the key-value pair from blocks of the blockchain structure 124.

Figure 2A:
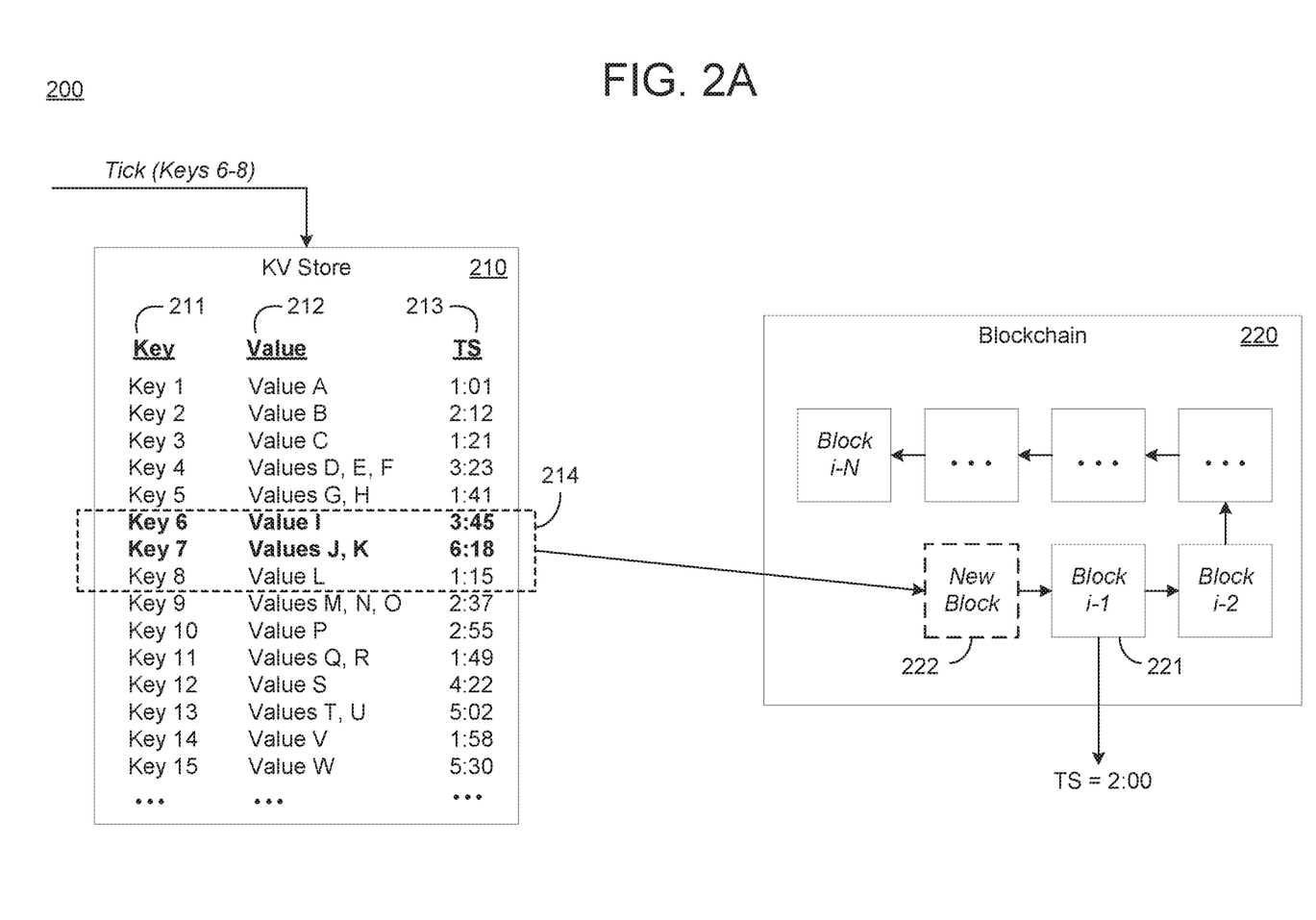
FIG. 2A is a diagram illustrating a process of determining to store key value pairs in a blockchain according to example embodiments.
Figure 2B:
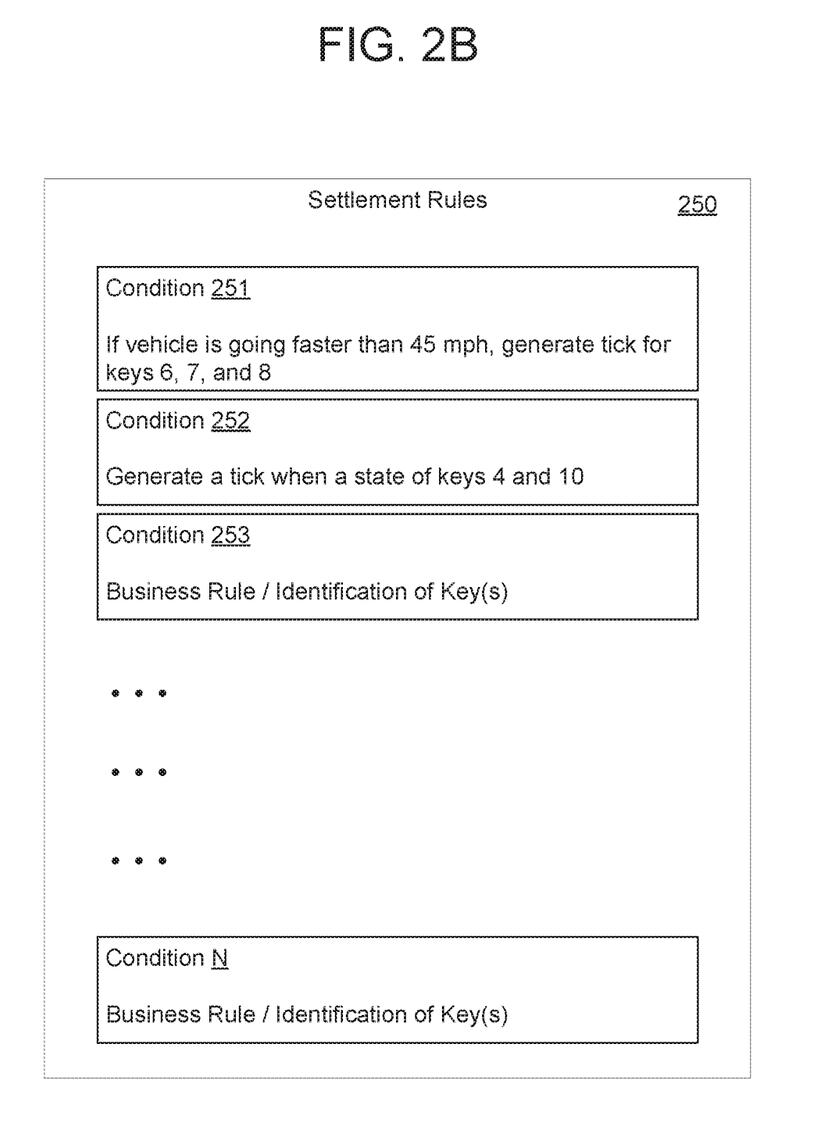
FIG. 2B is a diagram illustrating settlement rules which control when a new block is created according to example embodiments.

FIG. 2A illustrates a process 200 of determining to store key value pairs in a blockchain 220 according to example embodiments. Referring to FIG. 2A, a key-value store 210 interacts with a blockchain 220. Here, the key-value store 210 and the blockchain 220 may correspond to the key-value store 122 and the blockchain structure 124, respectively, shown in FIG. 1. The key-value store 210 includes a plurality of keys 211 which are paired with a plurality of values 212, respectively. Each key may include one or more values. Furthermore, each key-value pair may include a timestamp 213 identifying when the key-value pair was last updated (most recently changed).

In this example, the key-value store 210 receives a tick operation associated with one or more business rules (settlement rules shown in FIG. 2B). In response, the key-value store 210 may determine whether or not to create a new data block. For example, a control program (software) of the key-value store 210, a database including the key-value store 210, or the like, may determine whether or not a block should be created. The tick may be created based on a condition stored within the settlement rules. In some embodiments, the tick may identify one or more keys (e.g., keys 6, 7, and 8 in this example.) That is, the tick identifies a subset 214 of keys from the key-value store 210.

In response to receiving the tick operation, the key value store 210 determines whether or not any of the keys 6, 7, and 8 within the subset 214 have been changed since a most recent tick operation associated with keys 6, 7, and 8. For example, the key-value store 210 may compare timestamps 213 of key values 6, 7, and 8 stored within the key value store 210 to a timestamp of a block 221 which includes the most recently stored values of keys 6, 7, and 8. In this example, the block 221 includes a timestamp of 2:00. Thus, the key-value store determines that keys 6 and 7 have been updated since block 221 was stored on the blockchain 220. In other words, keys 6 and 7 have been updated since the most recent versions of keys 6 and 7 were added to the blockchain 220. Therefore, the key-value store 210 may determine to create a new block 222 and store the new block 222 on the blockchain 220.

The new block 222 may include values of all three keys 6, 7, and 8, even though only keys 6 and 7 have changed values. As another example, only the key-values (i.e., keys 6 and 7) with different/changed values may be added to the new block 222. As yet another example, rather than storing actual key-values, the new block 222 may store a hash or hash digest of the key-values of the key-value pairs to reduce the amount of data added to the blockchain 220.

In the example embodiments, instead of having transactions such as in a traditional blockchain, the key value store 210 receives a tick operation which includes a list of keys. In some embodiments, the tick operation may further include a digest of the current values of the keys. The key-value store 210 may verify whether the current values of the keys are already stored on the blockchain 220. Here, the tick operation does not always require the generation of the new block. For example, if no values are changed, then there is no need to create a new block. Rather, the tick will generate the new block 222 if at least one value from among keys 6, 7, and 8, has been modified. The tick may be triggered by a mobile application, a web application, a website, etc. which access a database.

The application providing the tick may be unaware of the blockchain structure. That is, the application may interact with the key-value store 210 as normal with put( ) get( ) etc. But, in addition, the application can request a tick which is a new operation. In this case, the application may trigger the key-value store 210 to create an immutable record based on a state of the data stored in the underlying key-value pairs associated with the tick operation. The business logic of a business application can enable this. For example, settlement rules 250 shown in FIG. 2B specify which state of the key-value store 210 an application wants to preserve with the blockchain 220. These settlement rules are also novel.

Referring to FIG. 2B, the settlement rules 250 include a plurality of conditions 251, 252, and 253, which specify rules for creating a new block. The conditions 251, 252, and 253 (e.g., conditional statements, etc.) also identify when a tick should be generated. In general, the settlement rules 250 identify a business rule for when to create the tick and one or more keys which are to be included in a block when the tick results in a new data block. The settlement rules 250 are related to the current state of the key-value store 210 at which point in time an application associated with the data wants to create a new block. The settlement rules 250 can provide different contextual scenarios in which blocks are generated. The settlement rules 250 may refer to the state such as current values/context of the data in the KVS.

In this example, when a condition in the settlement rules 250 is met, a tick operation is triggered and a block determination is made (and then created if necessary). In some embodiments, the tick operation may be triggered by the database itself based on a conditional statement in the settlement rules 250 being triggered/detected. For example, a time-driven trigger (e.g., an elapse of a predetermined period of time, a specific time/day of the week, etc.) or an event-driven trigger (e.g., a change in value to a particular key, etc.) may trigger a conditional statement and cause the key-value store 210 to generate a new block with particularly key-values stored therein.

Furthermore, an application and/or a user device may receive a notification indicating that the new block has been created as a result of a condition being met. Thus, the application can listen for a new block to be generated. Specifically that application may listen for contextual attributes occurring (tracking an event, etc.) this can formally demonstrate that these conditions have occurred. The application may listen for current values on the data store. Then, the application may listen to these changes and detect when a condition has occurred (change in value) that corresponds to a business condition.

In this case, new blocks may only be generated at specific conditions rather than after every certain amount of transactions. That is, the key-value store 210 may only generate a block when a condition is met. The block includes the keys, hash of the current values, and a timestamp. The blocks in the blockchain 220 do not have the concept of transactions. Rather, the blocks may contain the current values of the keys, hash of the previous block, timestamp. Furthermore, the blockchain 220 does not need peers, endorsement, ordering, etc. The database may have multiple nodes, but it is not necessary. If the key-value store is apart of a database that includes multiple nodes, one node may be selected as a master, and a replica is then distributed to the other slave nodes. The example embodiments are agnostic of one node or multiple nodes. Smart contracts are not needed either.

In some embodiments, the settlement rules 250 are optional. The tick could be triggered without declarative settlement rules. As another example, the key-value store 210 may implement an express tick—commit and tick. When the put/get methods are finished, the key-value store may automatically execute a tick. But the tick won't generate a block unless there are changes to the key values of the list of keys. This could be beneficial when an application has multiple users accessing the key-value store 210 at the same time and capable of changing key values. The commit/tick will generate the block with these changes.

In some embodiments, the key-value store 210 may implement transactions. For example, the key-value store 210 may be configured with business rules to change values to key-value pairs based on time, events, conditions, or the like. Thus, the underlying key-value store 210 may issue a transaction. In this example, the changes to key-value pairs may occur atomically. In such a case, the key-value store 210 may create a new block (if a value of a key-value pair changed) as part of the transaction being processed.

Figure 3:
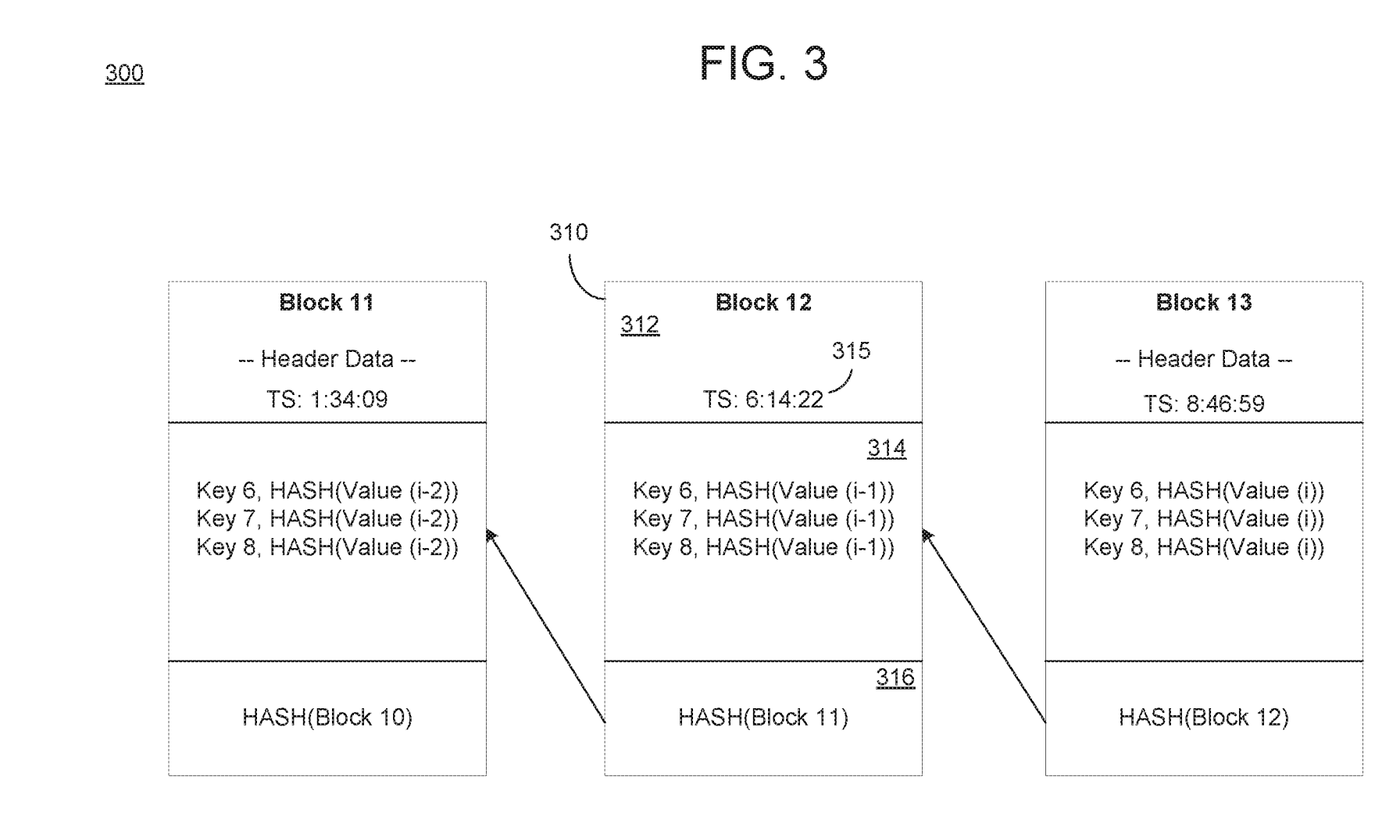
FIG. 3 is a diagram illustrating hash-linked block content of a blockchain according to example embodiments.

FIG. 3 illustrates a blockchain 300 which includes hash-linked block content according to example embodiments. The blockchain 300 may correspond to the blockchain 220 shown in FIG. 2A. In this example, a sequence of three blocks (block numbers 11, 12, and 13) are shown. The blockchain 300 may include a sequential chain of blocks where each block is hash-linked to an immediately previous block thereby creating an immutable sequence of blocks, referred to as a blockchain. In the example of FIG. 3, a block 310 corresponds to block number 12 in the sequence. Here, the block 310 includes a header 312, a data section 314, and a metadata section 316, however, embodiments are not limited thereto.

The header 312 may include a hash of the data block itself. For example, the header 312 may include a hash of the content of block 12. As another example, the header 312 may include a timestamp 315 indicating when the block was generated. The data section 314 may include an identifier of the keys and a hash value of each of the keys. Here, the data section 314 includes hashed values for keys 6, 7, and 8, at the current time (i–1). The metadata section 316 may include a hash of an immediate previous block in the blockchain 300, which in this example is a hash of block 11. The hash may include the header of block 11, the data section of block 11, or some other combination of data. Each block in the chain may be linked to an immediate previous block through the previous hash in the metadata section 316.

Figure 4:
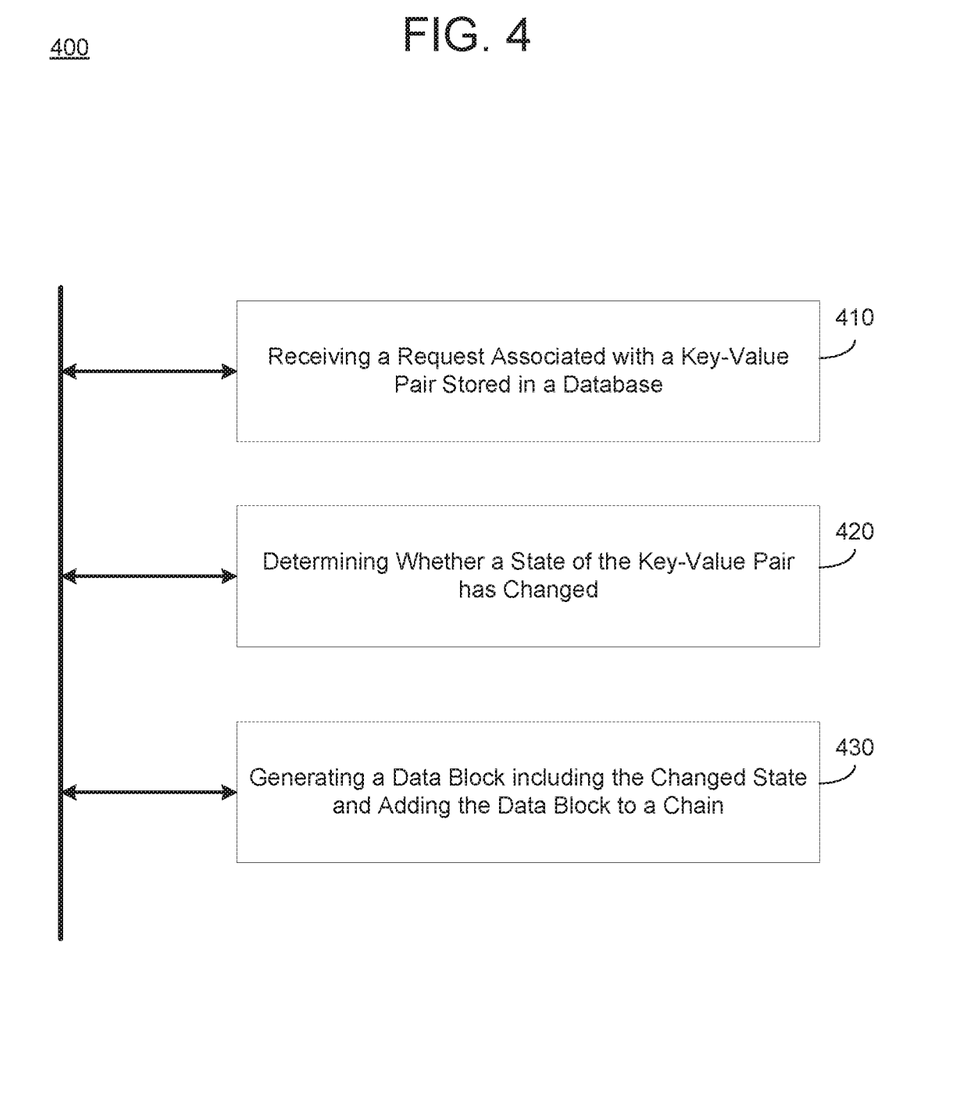
FIG. 4 is a diagram illustrating a method of storing data of a key-value pair in a blockchain based on a change in state according to example embodiments.

FIG. 4 illustrates a method 400 of storing data of a key-value pair in a blockchain based on a change in state according to example embodiments. For example, the method may be performed by a controller, program, processor, etc., implemented within a key-value store or other type of data store. In 410, the method may include receiving a request associated with a key-value pair stored in a database. Here, the request may identify one or more key-value pairs that are to be copied to a blockchain on a conditional basis. As an example, the request may include a tick operation which is requested by an application such as a web application, mobile application, software application, service, microservice-, or the like. The one or more key-value pairs may be data of the application.

In 420, the method may include determining whether a state of the key-value pair of the request has changed since a most recently received request. In this example, the system may determine whether a current value of the key-value pair has changed since a last tick operation. For example, the method may compare a timestamp of a block including the key-value pair with a current timestamp associated with the key-value pair to determine whether the value of the key-value pair has changed since it was last recorded on the blockchain. Other comparisons are also possible. For example, a timestamp indicating a last tick operation may be included in the current tick operation.

In response to a determination that the state of the key-value pair has changed, in 430 the method may include generating a data block that includes a changed state of the key-value pair and adding the generated data block to a hash-linked chain of data blocks. In some embodiments, the method may further include, in response to a determination that the state of the key-value pair has not changed, sending an instruction not to generate a data block. In some embodiments, the method may further include transmitting a notification indicating that the data block is generated to an application associated with the key-value pair.

In some embodiments, the data store may include a key-value store that comprises a plurality of records which each comprise a unique key paired with one or more respective data values. In some embodiments, the request may be associated with a plurality of key-value pairs, and the determining comprises determining whether any of the plurality of key-value pairs have changed. In some embodiments, the adding may further include storing a hash of a previous block in the hash-linked chain of data blocks within the generated data block.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 5 illustrates an example computer system architecture 500, which may represent or be integrated in any of the above-described components, etc.

Figure 5:
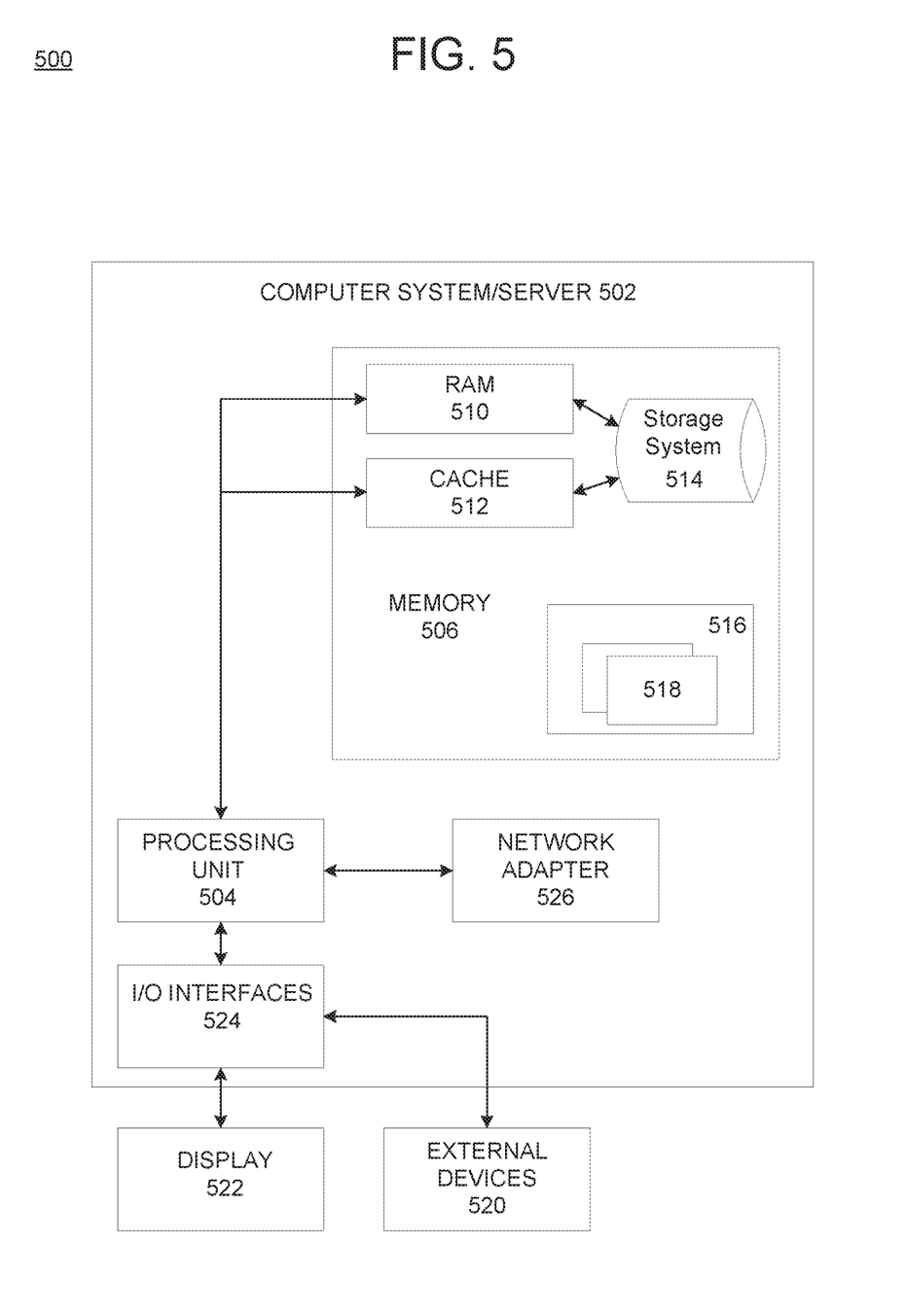
FIG. 5 is a diagram illustrating a computer system configured to support one or more of the example embodiments.

FIG. 5 is not intended to suggest any limitation as to the scope of use or functionality of embodiments of the application described herein. Regardless, the computing node 500 is capable of being implemented and/or performing any of the functionality set forth hereinabove. For example, the computing node 500 may be a network server of a larger enterprise network that connects multiple user workstations to the Internet, a private network, or the like.

In computing node 500 there is a computer system/server 502, which is operational with numerous other general purpose or special purpose computing system environments or configurations. Examples of well-known computing systems, environments, and/or configurations that may be suitable for use with computer system/server 502 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 502 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 502 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 502 in cloud computing node 500 is shown in the form of a general-purpose computing device. The components of computer system/server 502 may include, but are not limited to, one or more processors or processing units (processor) 504, a system memory 506, and a bus that couples various system components including the system memory 506 to the processor 504.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 502 typically includes a variety of computer system readable media. Such media may be any available media that is accessible by computer system/server 502, and it includes both volatile and non-volatile media, removable and non-removable media. System memory 506, in one embodiment, implements the flow diagrams of the other figures. The system memory 506 can include computer system readable media in the form of volatile memory, such as random-access memory (RAM) 510 and/or cache memory 512. Computer system/server 502 may further include other removable/non-removable, volatile/non-volatile computer system storage media. By way of example only, storage system 514 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 506 may include at least one program product having a set (e.g., at least one) of program modules that are configured to carry out the functions of various embodiments of the application.

Program/utility 516, having a set (at least one) of program modules 518, may be stored in memory 506 by way of example, and not limitation, as well as an operating system, one or more application programs, other program modules, and program data. Each of the operating system, one or more application programs, other program modules, and program data or some combination thereof, may include an implementation of a networking environment. Program modules 518 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 502 may also communicate with one or more external devices 520 such as a keyboard, a pointing device, a display 522, etc.; one or more devices that enable a user to interact with computer system/server 502; and/or any devices (e.g., network card, modem, etc.) that enable computer system/server 502 to communicate with one or more other computing devices. Such communication can occur via I/O interfaces 524 (which may be referred to herein as an output and/or an input). Still yet, computer system/server 502 can communicate with one or more networks such as a local area network (LAN), a general wide area network (WAN), and/or a public network (e.g., the Internet) via network adapter 526. As depicted, network adapter 526 communicates with the other components of computer system/server 502 via a bus. It should be understood that although not shown, other hardware and/or software components could be used in conjunction with computer system/server 502. Examples, include, but are not limited to: microcode, device drivers, redundant processing units, external disk drive arrays, RAID systems, tape drives, and data archival storage systems, etc.

According to various embodiments, the processor 504 may receive a request associated with a key-value pair stored in a database. In this example, the database may include a key-value database that includes a key-value store. The request may be received from an application that is connected to the computing system 502 via a network (network adapter 526). As another example, the request may be provided internally such as from the processor 504 detecting a change to a key-value pair, etc.

The processor 504 may determine whether a state of the key-value pair has changed since a most recently received request. For example, the processor 504 may compare a timestamp of a block including the key-value pair with a current timestamp associated with the key-value pair to determine whether the value of the key-value pair has changed since it was last recorded on the blockchain. In response to a determination that the state of the key-value pair has changed, the processor 504 may generate a data block that includes a changed state of the key-value pair and add the generated data block to a hash-linked chain of data blocks.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. An apparatus comprising:
   a memory comprising a key-value store (KVS) and a blockchain ledger; and
   a processor configured to receive a request from a software application, where the request identifies a key stored in the KVS, determine whether a state of a key-value pair stored in the KVS which correspond to the key in the received request has changed since a most recently received request from the software application based on a comparison of a timestamp stored in a block previously committed to the blockchain ledger which includes a most-recently committed value of the key-value pair and of the key-value pair in the KVS, in response to a determination that the state of the key-value pair has changed in the KVS, generate a new data block that includes a changed state of the key-value pair included in the request and a hash pointer to the block which includes the most recently committed value of the key-value pair from the software application, and commit the new data block to the blockchain ledger.

2. The apparatus of claim 1, wherein, in response to a determination that the state of the key-value pair has not changed, the processor is further configured to send an instruction to not generate a data block.

3. The apparatus of claim 1, wherein the processor is configured to receive a tick operation triggered by the software application which identifies a subset of keys from among a larger set of keys within the KVS.

4. The apparatus of claim 1, wherein the processor is further configured to transmit a notification which indicates that the new data block is generated to the software application.

5. The apparatus of claim 1, wherein the KVS comprises a plurality of records which each comprise a unique key paired with one or more respective data values.

6. The apparatus of claim 1, wherein the request is associated with a plurality of key-value pairs, and the processor determines whether any of the plurality of key-value pairs have changed since the most recently received request.

7. The apparatus of claim 1, wherein the processor is configured to store a hash of block content from the previously committed block which includes the most recently committed value of the key-value pair from the software application within the new data block.

8. The apparatus of claim 1, wherein the processor is further configured to detect that a conditional statement from among a plurality of predefined conditional statements has occurred with respect to the database, and automatically generate hail the new data block based on the detected conditional statement.

9. A method comprising:

receiving a request from a software application, where the request identifies a key stored in a key-value store (KVS) in storage;

determining whether a state of a key-value pair stored in the KVS which corresponds to the key in the received request has changed since a most recently received request from the software application based on a comparison of a timestamp stored in a block previously committed to a blockchain ledger in the storage which includes a most-recently committed value of the key-value pair and a current timestamp of the key-value pair in the KVS;

in response to a determination that the key-value pair has changed, generating a data block that includes a changed state of the key-value pair included in the request and a hash pointer to the block which includes the most recently committed value of the key-value pair from the software application; and committing the new data block to the blockchain ledger.

10. The method of claim 9, further comprising, in response to a determination that the state of the key-value pair has not changed, sending an instruction not to generate a data block.

11. The method of claim 9, wherein the receiving comprises receiving a tick operation triggered by the software application which identifies a subset of keys from among a larger set of keys within the KVS.

12. The method of claim 9, further comprising transmitting a notification indicating that the new data block is generated to the software application.

13. The method of claim 9, wherein the KVS comprises a plurality of records which each comprise a unique key paired with one or more respective data values.

14. The method of claim 9, wherein the request is associated with a plurality of key-value pairs, and the determining comprises determining whether any of the plurality of key-value pairs have changed.

15. The method of claim 9, wherein the committing further comprises storing a hash of block content from the previously committed block that includes the most recently committed value of the key-value pair t from the software application within the new data block.

16. The method of claim 9, further comprising detecting that a conditional statement from among a plurality of predefined condition statements has occurred with respect to the database, and automatically generating flail the new data block based on the detected conditional statement.

17. A non-transitory computer readable medium comprising instructions, that when read by a processor, cause the processor to perform a method comprising:

receiving a request from a software application, where the request identifies a key stored in a key-value store (KVS) in storage;

determining whether a state of a key-value pair stored in the KVS which corresponds to the key in the received request has changed since a most recently received request from the software application based on a comparison of a timestamp stored in a block previously committed to a blockchain ledger in the storage which includes a most-recently committed value of the key-value pair and a current timestamp of the key-value pair in the KVS;

in response to a determination that the key-value pair has changed, generating a data block that includes a changed state of the key-value pair included in the request and a hash pointer to the block which includes the most recently committed value of the key-value pair from the software application; and committing the new data block to the blockchain ledger.

18. The non-transitory computer readable medium of claim 17, wherein the method further comprises, in response to a determination that the state of the key-value pair has not changed, sending an instruction not to generate a data block.

* * * * *